United States Patent
Koike et al.

(10) Patent No.: US 12,398,769 B2
(45) Date of Patent: Aug. 26, 2025

(54) ELECTROMAGNETIC BRAKE DEVICE

(71) Applicant: ALPS ALPINE CO., LTD., Tokyo (JP)

(72) Inventors: Asuka Koike, Miyagi (JP); Shigeru Furuki, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 455 days.

(21) Appl. No.: 18/047,393

(22) Filed: Oct. 18, 2022

(65) Prior Publication Data

US 2023/0068870 A1 Mar. 2, 2023

Related U.S. Application Data

(63) Continuation of application No. PCT/JP2021/017297, filed on Apr. 30, 2021.

(30) Foreign Application Priority Data

May 7, 2020 (JP) ................................. 2020-081953

(51) Int. Cl.
*F16D 55/28* (2006.01)
*F16D 65/18* (2006.01)
(Continued)

(52) U.S. Cl.
CPC ........... *F16D 55/28* (2013.01); *F16D 65/186* (2013.01); *F16D 2121/20* (2013.01); *G05G 5/03* (2013.01); *G05G 2505/00* (2013.01)

(58) Field of Classification Search
None
See application file for complete search history.

(56) References Cited

U.S. PATENT DOCUMENTS 3,734,245 A * 5/1973 Hubbard ................. F16D 55/00
188/163
5,739,610 A * 4/1998 Nemoto .............. F16D 55/2245
310/93
(Continued)

FOREIGN PATENT DOCUMENTS

DE 102018101266 A1 * 7/2019
EP 0009180 A1 * 4/1980
(Continued)

OTHER PUBLICATIONS

EP-0009180-A1—English Machine Translation (Year: 1980).*
(Continued)

*Primary Examiner* — Melanie Torres Williams
(74) *Attorney, Agent, or Firm* — IPUSA, PLLC

(57) ABSTRACT

An electromagnetic brake device includes an armature rotatably supported about a rotational axis; a yoke including a groove, an inner cylinder portion, and an outer cylinder portion; and a coil arranged in the groove and configured to generate a magnetic force when energized and thereby attract the armature to the yoke. A first opposing surface of the armature facing the yoke includes a sliding surface configured to slide on the outer cylinder portion of the yoke, and a recessed portion disposed inward of the sliding surface in a radial direction and recessed in a direction away from the yoke. An inner perimeter area of a second opposing surface of the outer cylinder portion of the yoke and a third opposing surface of the inner cylinder portion of the yoke face the recessed portion of the armature and do not contact the first opposing surface of the armature.

4 Claims, 2 Drawing Sheets

(51) Int. Cl.
*F16D 121/20* (2012.01)
*G05G 5/03* (2008.04)

(56) References Cited

U.S. PATENT DOCUMENTS

| | | | |
|---|---|---|---|
| 6,206,149 B1* | 3/2001 | Heidenreich | F16D 55/227 |
| | | | 188/71.7 |
| 7,604,099 B2* | 10/2009 | Kigawa | B66B 5/18 |
| | | | 188/161 |
| 2005/0207815 A1 | 9/2005 | Terao et al. | |
| 2013/0199881 A1 | 8/2013 | Sano | |
| 2014/0332330 A1* | 11/2014 | Orr | F16D 65/127 |
| | | | 188/218 XL |
| 2019/0316642 A1* | 10/2019 | Silvestrini | F16D 55/22 |

FOREIGN PATENT DOCUMENTS

| | | |
|---|---|---|
| JP | S61-192934 | 8/1986 |
| JP | H07-138712 | 5/1995 |
| JP | H08-284979 | 11/1996 |
| JP | 2005-262803 | 9/2005 |
| JP | 2013-160356 | 8/2013 |
| JP | 2015-132356 | 7/2015 |

OTHER PUBLICATIONS

DE-102018101266-A1—English Machine Translation (Year: 2019).*
International Search Report for PCT/JP2021/017297 mailed on Jun. 22, 2021.

* cited by examiner

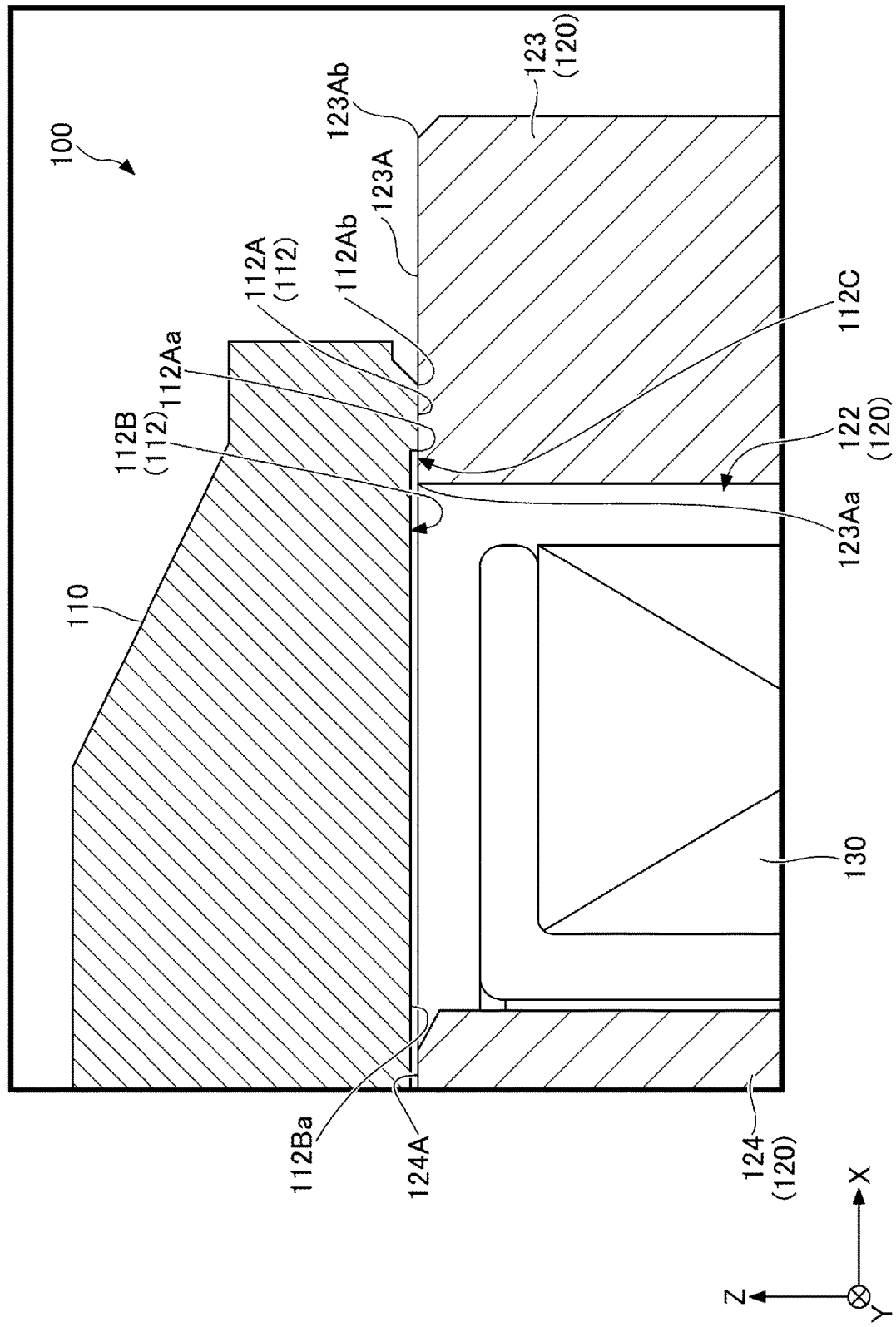

ELECTROMAGNETIC BRAKE DEVICE

CROSS-REFERENCE TO RELATED APPLICATIONS

This application is a continuation of International Application No. PCT/JP2021/017297, filed on Apr. 30, 2021 and designating the U.S., which claims priority to Japanese Patent Application No. 2020-081953, filed on May 7, 2020. The contents of these applications are incorporated herein by reference in their entirety.

BACKGROUND OF THE INVENTION

1. Field of the Invention

The present disclosure relates to electromagnetic brake devices.

2. Description of the Related Art

Conventionally, a gear shift device that enables a transmission to be shifted by a rotation operation via a knob is used in, for example, a vehicle such as an automobile. Also, conventionally, a technique that uses an electromagnetic brake device to brake the rotation of the knob is used in such a gear shift device.

For example, Patent Document 1 discloses a technique in which the rotation of an operation knob and a rotary shaft is braked by causing the lower surface of an armature that rotates integrally with the operation knob and the rotary shaft to be attracted to the end surface of an external yoke portion of a yoke core based on the magnetic force generated from a coil.

However, in technique disclosed in Patent Document 1, burrs can form on an inner perimeter area of the end surface when a cutting process is performed to form the end surface of the external yoke. In such a case, the burrs can contact the lower surface of the armature when the armature is rotating. This may reduce the brake torque, may damage the paint on the lower surface of the armature such that it increases friction during a non-conductive state, or may reduce durability.

RELATED-ART DOCUMENTS

Patent Documents

Patent Document 1: Japanese Patent Application No. 2013-160356

SUMMARY OF THE INVENTION

An electromagnetic brake device according to one embodiment includes an armature rotatably supported about a rotational axis; a yoke including a groove formed in an annular shape and centered on the rotational axis, an inner cylinder portion having a substantially cylindrical shape and disposed inward of the groove in a radial direction, and an outer cylinder portion having a substantially cylindrical shape and disposed outward of the groove in the radial direction; and a coil arranged in the groove and configured to generate a magnetic force when energized and thereby attract the armature to the yoke. A first opposing surface of the armature facing the yoke includes a sliding surface configured to slide on the outer cylinder portion of the yoke, and a recessed portion disposed inward of the sliding surface in the radial direction and recessed in a direction away from the yoke. An inner perimeter area of a second opposing surface of the outer cylinder portion of the yoke facing the armature and a third opposing surface of the inner cylinder portion of the yoke facing the armature are arranged to face the recessed portion of the armature and do not contact the first opposing surface of the armature.

BRIEF DESCRIPTION OF THE DRAWINGS

Other objects and further features of the present invention will be apparent from the following detailed description when read in conjunction with with the accompanying drawings, in which:

FIG. 2. is a partially enlarged cross-sectional view illustrating an enlarged view of a portion A of the electromagnetic brake device illustrated in FIG. 1.

DESCRIPTION OF THE EMBODIMENTS

Figure 1:
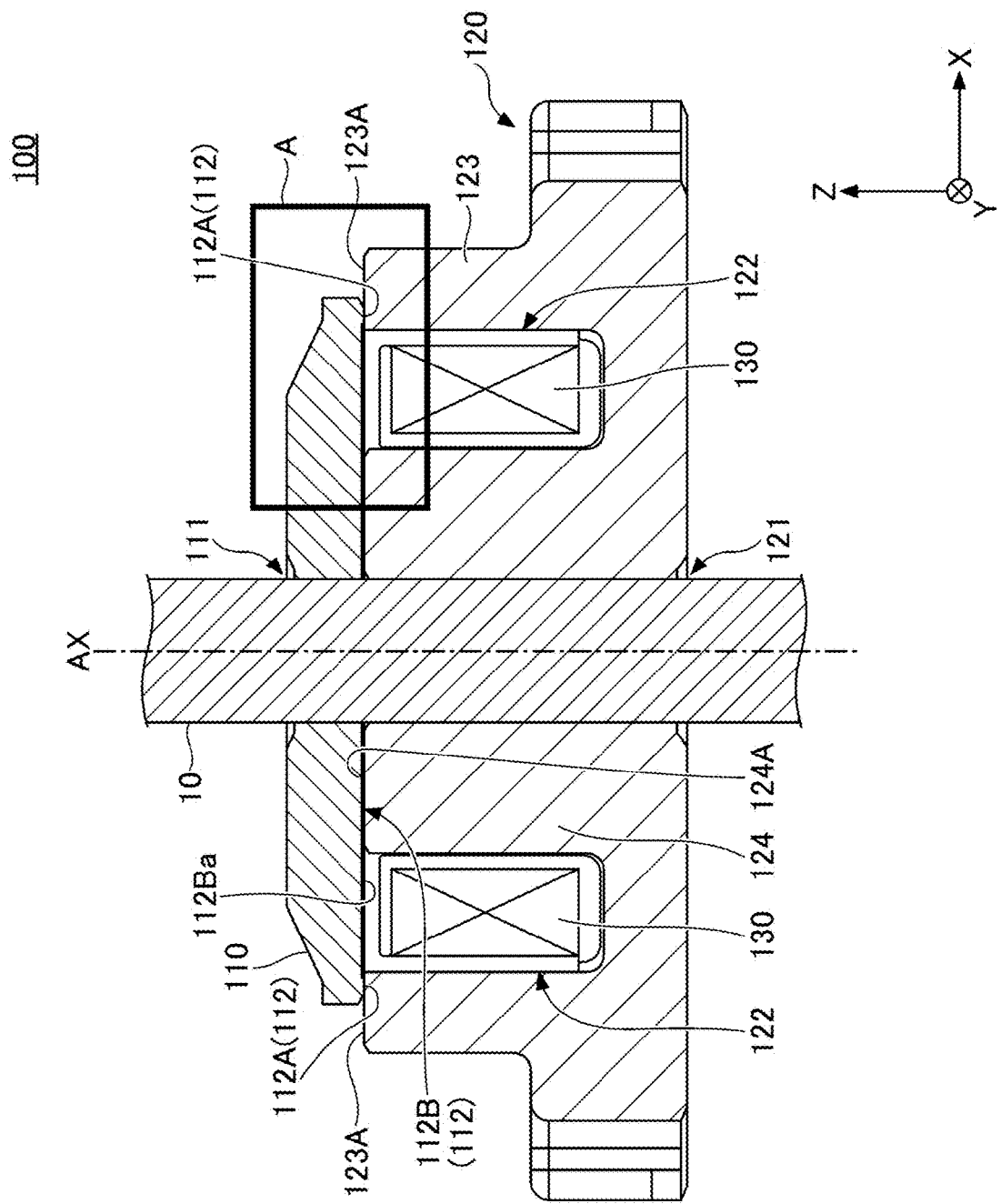
FIG. 1 is a cross-sectional view illustrating a cross section parallel to the XZ plane of an electromagnetic brake device according to one embodiment.

According to one embodiment, it is possible to inhibit a reduction in brake torque or damage to the coating on a lower surface of an armature due to the presence of burrs on an inner perimeter area of a yoke.

The embodiment of the present invention will be described hereinafter with reference to the accompanying drawings. In the following description, assume that the Z-axis direction (the axis direction of a rotational axis AX) in each drawing indicates the vertical direction, and the X-axis direction and the Y-axis direction (directions perpendicular to the axis direction of the rotational axis AX) in each drawing indicate the horizontal direction.

Outline of Electromagnetic Brake Device 100

FIG. 1 is a cross-sectional view illustrating a cross section parallel to the XZ plane of an electromagnetic brake device 100 according to the embodiment. The electromagnetic brake device 100 illustrated in FIG. 1 is a device that is arranged coaxially with the rotational axis AX of a rotary shaft 10 and is configured to brake the rotation of the rotary shaft 10. As illustrated in FIG. 1, the electromagnetic brake device 100 includes the rotary shaft 10, an armature 110, a yoke 120, and a coil 130.

The electromagnetic brake device 100 is used in, for example, a gear shift device that enables a transmission to be shifted by a rotation operation via a knob (illustration omitted). In this case, for example, the electromagnetic brake device 100 is attached to the rotary shaft 10 that rotates in conjunction with the rotation of the operation knob, and the armature 110 is coupled to the rotary shaft 10 so as to be movable in the vertical direction (Z-axis direction) but is fixed in the rotation direction. The electromagnetic brake device 100 brakes the rotation of the operation knob and the rotary shaft 10 by attracting the armature 110 to the yoke 120 based on the magnetic force generated by the coil 130. However, application of the electromagnetic brake device 100 is not limited to the gear shift device. The electromagnetic brake device 100 may be used in any device that includes at least the rotary shaft 10.

The armature 110 is a disc-shaped member. The armature 110 includes a through hole 111 that is centered on the rotational axis AX and passes through the armature 110 in the vertical direction (Z-axis direction). The inner diameter of the through hole 111 is substantially the same as the outer diameter of the rotary shaft 10. Also, although not illustrated in the drawings, the through hole 111 has, for example, a D-profile shape extending in the rotation-axis direction that prevents rotation with respect to the rotation direction. Hence, the armature 110 is able to move up and down with respect to the rotary shaft 10, and is able to rotate integrally with the rotary shaft 10 with respect to the rotation direction. The rotary shaft 10 is inserted in the armature 110 such that the armature 110 is rotatably supported about the rotational axis AX by the rotary shaft 10 (or by another member that rotates integrally with the rotary shaft 10). Hence, the armature 110 rotates integrally with the rotary shaft 10 about the rotational axis AX.

The armature 110 includes a disc-shaped first opposing surface 112 that faces the yoke 120 in a plan view. An annular sliding surface 112A is arranged on a radially outer portion of the first opposing surface 112. The sliding surface 112A faces and contacts a second opposing surface 123A of an outer cylinder portion 123 of the yoke 120. Hence, the sliding surface 112A slides on the second opposing surface 123A when the armature 110 rotates.

A recessed portion 112B that is circular in a plan view and is recessed in a direction (a positive Z-axis direction) away from the yoke 120 is formed on a portion of the first opposing surface 112 of the armature 110 that is inward of the sliding surface 112A in the radial direction. Hence, the portion of the first opposing surface 112 of the armature 110 that is disposed inward of the sliding surface 112A in the radial direction is slightly separated from a third opposing surface 124A of an inner cylinder portion 124 of the yoke 120 so as not to contact the third opposing surface 124A.

For example, the armature 110 may be made of a magnetic material (for example, iron) so that the armature 110 can be attracted to the yoke 120 based on the magnetic force generated by the coil The yoke 120 is a cylindrical member that is arranged below the armature 110 and is made of a magnetic material (for example, iron). The yoke 120 forms a magnetic circuit that passes through the inner cylinder portion 124, the outer cylinder portion 123, and the armature 110, thus attracting the armature 110 based on the magnetic force generated by the coil 130. Hence, the rotation of the armature 110 can be braked by the yoke 120.

The yoke 120 includes a circular through hole 121 centered on the rotational axis AX. The through hole 121 passes through the yoke 120 in the vertical direction (the Z-axis direction). The inner diameter of the through hole 121 is substantially the same as the outer diameter of the rotary shaft 10. The rotary shaft 10 that rotates integrally with the armature 110 is inserted in the through hole 121. However, since the yoke 120 is not fixed to the rotary shaft 10, the yoke 120 does not rotate integrally with the rotary shaft 10.

In addition, the yoke 120 includes a groove 122 that has been formed by cutting the upper surface of the yoke 120 downward (in the negative Z-axis direction) into an annular recessed shape centered on the rotational axis AX. Hence, the yoke 120 includes the outer cylinder portion 123, which has a substantially cylindrical shape and is disposed further outward of the groove 122 in the radial direction, and an inner cylinder portion 124, which has a substantially cylindrical shape and is disposed inward of the groove 122 in the radial direction.

The yoke 120 is formed by powder metallurgy. By powder metallurgy, even metals that are difficult to machine in bulk or materials that are poorly soluble can be formed into complex shapes with high precision. The opposing surfaces of the yoke 120 that face the armature 110 are formed to be flush with each other (that is, to be the same height as each other) in the Z direction. However, the opposing surfaces of the yoke 120 that face the armature 110 are divided by the groove 122 into the second opposing surface 123A of the outer cylinder portion 123, which faces the armature 110, and the third opposing surface 124A of the inner cylinder portion 124, which faces the armature 110.

The coil 130 is formed into a cylindrical shape by winding a wire multiple times in the groove 122 of the yoke 120. The coil 130 generates a magnetic force when energized, and the magnetic force attracts the armature 110 to the yoke 120. As a result, the electromagnetic brake device 100 is able to brake the rotation of the rotary shaft 10 that rotates integrally with the armature 110. That is, the rotation of the operation knob that rotates in conjunction with the rotation of the rotary shaft 10 can be braked.

FIG. 2 is a partially enlarged cross-sectional view illustrating an enlarged view of a portion A of the electromagnetic brake device 100 illustrated in FIG. 1.

As illustrated in FIG. 2, the third opposing surface 124A of the inner cylinder portion 124 of the yoke 120 faces the recessed portion 112B of the first opposing surface 112 of the armature 110. Hence, the third opposing surface 124A is spaced apart from the first opposing surface 112 (a back surface 112Ba of the recessed portion 112B) with a very narrow predetermined gap (for example, 0.05 mm) interposed therebetween. That is, the third opposing surface 124A does not contact the first opposing surface 112. Thus, in the electromagnetic brake device 100 according to the embodiment, even if the precision (such as the flatness) of the components of the armature 110 varies, the armature 110 does not contact the third opposing surface 124A of the yoke 120 that is disposed in the inner portion of the yoke 120 in the radial direction. Therefore, reduction in the attraction force for attracting the armature 110 can be inhibited while reducing the rotation load of the armature 110.

In addition, as illustrated in FIG. 2, the sliding surface 112A of the armature 110 faces and contacts the second opposing surface 123A of the outer cylinder portion 123 of the yoke 120. Hence, the sliding surface 112A of the armature 110 slides on the second opposing surface 123A in accordance with the rotation of the armature 110.

The sliding surface 112A is coated with a urethane-based baked-on paint. As a result, in the electromagnetic brake device 100 according to the embodiment, the coefficient of friction between the sliding surface 112A and the second opposing surface 123A may decrease during a non-braking state in which the magnetic braking force is not applied, and the coefficient of friction between the sliding surface 112A and the second opposing surface 123A may increase during a braking state in which the magnetic braking force is applied.

In addition, as illustrated in FIG. 2, an inner perimeter area 123Aa (a portion of the second opposing surface 123A bordering the groove 122) of the second opposing surface 123A of the yoke 120 is arranged at a position facing the recessed portion 112B of the first opposing surface 112 of the armature 110. Hence, the inner perimeter area 123Aa of the second opposing surface 123A is spaced apart from the the first opposing surface 112 (the back surface 112Ba of the recessed portion 112B) of the armature 110. That is, the inner perimeter area 123Aa does not contact the first opposing surface 112.

Hence, in the electromagnetic brake device 100 according to the embodiment, even if burrs are generated on the inner perimeter area 123Aa of the second opposing surface 123A during machining to flatten the surface height, the first opposing surface 112 does not contact the burrs on the inner perimeter area 123Aa when the armature 110 is rotating. Therefore, in the electromagnetic brake device 100 according to the embodiment, it is possible to inhibit a reduction in brake torque or damage to the urethane-based baked-on paint on the sliding surface 112A due to the presence of the burrs on the inner perimeter area 123Aa.

Also, as illustrated in FIG. 2, the inner perimeter area 112Aa (a portion of the sliding surface 112A bordering the recessed portion 112B) of the sliding surface 112A of the armature 110 is arranged further inward from the inner perimeter area 123Aa of the second opposing surface 123A in the radial direction by a predetermined distance (for example, 1.0 mm). Hence, in the electromagnetic brake device 100 according to the embodiment, even even if burrs are generated on the inner perimeter area 123Aa of the second opposing surface 123A during machining, the sliding surface 112A does not contact the burrs on the inner perimeter area 123Aa when the armature 110 is rotating. Therefore, in the electromagnetic brake device 100 according to the embodiment, it is possible to inhibit influence on brake torque or damage to the urethane-based baked paint on the sliding surface 112A due to the presence of the burrs on the inner perimeter area 123Aa.

In addition, as illustrated in FIG. 2, an outer perimeter area 112Ab (an outermost radial portion of the sliding surface 112A) of the sliding surface 112A of the armature 110 is disposed inward of an outer perimeter area 123Ab (an outermost radial portion of the second opposing surface 123A) of the second opposing surface 123A in the radial direction. Hence, in the electromagnetic brake device 100 according to the embodiment, even if burrs are generated on the outer perimeter area 123Ab of the second opposing surface 123A during machining, the sliding surface 112A does not contact the burrs on the outer perimeter area 123Ab when the armature 110 is rotating. Therefore, in the electromagnetic brake device 100 according to the embodiment, it is possible to inhibit influence on brake torque or damage to the urethane-based baked-on paint on the sliding surface 112A due to the presence of burrs on the inner perimeter area 123Aa.

Furthermore, as illustrated in FIG. 2, the first opposing surface 112 of the armature 110 includes a step 112C on a boundary between the sliding surface 112A and the back surface 112Ba of the recessed portion 112B. Thus, the first opposing surface 112 of the armature 110 is not flat with respect to the height direction. In contrast, the second opposing surface 123A is flush with the third opposing surface 124A of the yoke 120 in the height direction. Hence, since the yoke 120 that has a complex shape is flattened in the electromagnetic brake device 100 according to the embodiment, processing can be performed more easily as compared to a case where a step is formed on the yoke 120, and thus a gap can be formed between the armature 110 and the yoke 120 with relatively high accuracy.

Therefore, in the electromagnetic brake device 100 according to the embodiment, the yoke 120 can be formed to have a complex shape, and secondary processing can be easily performed on the yoke 120.

Although the embodiment of the present invention has been described above, the present invention is not limited to this. Various changes and modifications can be made without departing from the scope of the present invention as described in the appended claims.

For example, although the recessed portion 112B according to the embodiment is a circular recessed portion that has a uniform depth, the recessed portion 112B may be divided into an annular recessed portion that faces the inner perimeter area 123Aa of the second opposing surface 123A and a circular recessed portion that faces the third opposing surface 124A. Furthermore, the depths and the shapes of the recessed portions may be configured to differ from each other.

What is claimed is:

1. An electromagnetic brake device comprising:
   an armature rotatably supported about a rotational axis;
   a yoke including
      a groove formed in an annular shape and centered on the rotational axis,
      an inner cylinder portion having a substantially cylindrical shape and disposed inward of the groove in a radial direction, and
      an outer cylinder portion having a substantially cylindrical shape and disposed outward of the groove in the radial direction; and
   a coil arranged in the groove and configured to generate a magnetic force when energized and thereby attract the armature to the yoke,
   wherein a first opposing surface of the armature facing the yoke includes
      sliding surface configured to slide on the outer cylinder portion of the yoke, and
      a recessed portion is disposed inward of the sliding surface in the radial direction and recessed in a direction away from the yoke,
   wherein an inner perimeter area of a second opposing surface of the outer cylinder portion of the yoke facing the armature and a third opposing surface of the inner cylinder portion of the yoke facing the armature are arranged to face the recessed portion of the armature and do not contact the first opposing surface of the armature, and
   wherein an outer perimeter area of the sliding surface of the armature is disposed inward of an outer perimeter area of the second opposing surface of the yoke in the radial direction.

2. The electromagnetic brake device according to claim 1, wherein the first opposing surface of the armature includes a step on a boundary between the sliding surface and a back surface of the recessed portion, and
   the second opposing surface is formed to be flush with the third opposing surface of the yoke.

3. The electromagnetic brake device according to claim 1, wherein the yoke is formed by powder metallurgy.

4. The electromagnetic brake device according to claim 1, wherein at least one of the sliding surface of the armature or the second opposing surface of the yoke is coated with a urethane-based baked-on paint.

* * * * *